US012517163B2

(12) United States Patent
Cui et al.

(10) Patent No.: US 12,517,163 B2
(45) Date of Patent: Jan. 6, 2026

(54) DISTURBANCE DIRECTION DETECTION IN A POWER SYSTEM

(71) Applicant: Accuenergy (Canada) Inc., Toronto (CA)

(72) Inventors: Shaohang Cui, Toronto (CA); Haoliang Deng, Toronto (CA); Ketao Li, Toronto (CA); Yufan Wang, Toronto (CA); Liang Wang, Toronto (CA)

(73) Assignee: Accuenergy (Canada) Inc., Toronto (CA)

( * ) Notice: Subject to any disclaimer, the term of this patent is extended or adjusted under 35 U.S.C. 154(b) by 206 days.

(21) Appl. No.: 18/337,303

(22) Filed: Jun. 19, 2023

(65) Prior Publication Data

US 2024/0418763 A1 Dec. 19, 2024

(51) Int. Cl.
*G01R 31/08* (2020.01)

(52) U.S. Cl.
CPC .................. *G01R 31/086* (2013.01)

(58) Field of Classification Search
CPC ................................................ G01R 31/086
See application file for complete search history.

(56) References Cited

U.S. PATENT DOCUMENTS

| | | | | |
|---|---|---|---|---|
| 2007/0055889 A1* | 3/2007 | Henneberry | ........... | H02H 7/261 713/186 |
| 2007/0239372 A1* | 10/2007 | Schweitzer | ............. | H02J 3/144 702/57 |
| 2009/0254655 A1* | 10/2009 | Kidwell | ............. | G05B 19/4183 709/224 |
| 2010/0324845 A1* | 12/2010 | Spanier | .............. | G01R 19/2513 702/62 |
| 2011/0035076 A1* | 2/2011 | Schweitzer, III | ..... | H02J 3/1821 700/296 |
| 2021/0165024 A1* | 6/2021 | Menzel | ..................... | H02J 3/00 |

* cited by examiner

*Primary Examiner* — Lisa M Caputo
*Assistant Examiner* — Sharah Zaab
(74) *Attorney, Agent, or Firm* — Michael D. Eisenberg; MDE Patents

(57) ABSTRACT

A system for determining the location of a disturbance event in a power system. The system includes a power feed bus for supplying electrical signal and an Intelligent Electronic Device coupled to the power feed bus. The Intelligent Electronic Device determines the single-phase direction of the disturbance event according to the changes between the average pre-event power, average pre-event current and average pre-event voltage and the average post-event power, average post-event current and average post-event voltage.

9 Claims, 7 Drawing Sheets

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| Voltage | 0 | 0 | 0 | 0 | 0 | 0 | 0 | 0 | 0 | 1 | 1 | 1 | 1 | 1 | 1 | 1 | 1 | 1 | 2 | 2 | 2 | 2 | 2 | 2 | 2 | 2 | 2 | 0: no change<br>1: increase<br>2: decrease |
| Current | 0 | 0 | 0 | 1 | 1 | 1 | 2 | 2 | 2 | 0 | 0 | 0 | 1 | 1 | 1 | 2 | 2 | 2 | 0 | 0 | 0 | 1 | 1 | 1 | 2 | 2 | 2 | |
| Power | 0 | 1 | 2 | 0 | 1 | 2 | 0 | 1 | 2 | 0 | 1 | 2 | 0 | 1 | 2 | 0 | 1 | 2 | 0 | 1 | 2 | 0 | 1 | 2 | 0 | 1 | 2 | |
| Combined Direction | 0 | 0 | 0 | 0 | 0 | 0 | 2 | 2 | 2 | 0 | 0 | 0 | 1 | 1 | 1 | 2 | 2 | 2 | 2 | 2 | 2 | 1 | 1 | 1 | 2 | 0 | 2 | 0: indeterminate<br>1: downstream<br>2: upstream |

FIG. 4

| Phase A direction | 0 | 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 0: indeterminate |
| --- | --- | --- | --- | --- | --- | --- | --- | --- | --- | --- | --- | --- | --- | --- | --- | --- | --- | --- | --- | --- | --- | --- | --- | --- | --- |
| Phase B direction | 0 | 0 | 1 | 1 | 2 | 2 | 2 | 2 | 2 | 0 | 0 | 0 | 1 | 1 | 1 | 2 | 2 | 0 | 0 | 1 | 1 | 2 | 2 | 2 | 1: downstream |
| Phase C direction | 0 | 2 | 1 | 2 | 0 | 1 | 2 | 2 | 1 | 0 | 1 | 2 | 0 | 1 | 2 | 1 | 2 | 2 | 1 | 0 | 2 | 0 | 1 | 2 | 2: upstream |
| Combined Direction | 0 | 2 | 1 | 2 | 2 | 1 | 2 | 2 | 2 | 0 | 1 | 2 | 0 | 1 | 2 | 0 | 2 | 2 | 0 | 0 | 2 | 0 | 0 | 2 | |

FIG. 5

DISTURBANCE DIRECTION DETECTION IN A POWER SYSTEM

FIELD OF THE INVENTION

The present disclosure generally relates to determining the location of a disturbance in a power system. More specifically, the present invention provides a system for determining the direction of a disturbance event at the individual meter location and a system for analyzing this data from multiple meter locations to locate the cause of the event in the power system.

BACKGROUND

To identify the root cause of a disturbance in power system, an experienced engineer might be required to analyze and interpret data captured by a power quality meter. It could be a slow process to acquire the relevant information and come up with a conclusion.

Disturbance direction detection uses comprehensive algorithms to analyze wave shape and disturbance data, which is much easier to troubleshoot a power quality problem. Disturbance direction detection is useful in pinpointing the source of the disturbance, and ultimately solving the problem. The traditional disturbance direction detection includes a complex computation based on a confidence level indicating the level of certainty that the disturbance is in the determined direction.

Therefore, a simple and efficient disturbance direction detection is needed.

SUMMARY OF THE INVENTION

The embodiments of the present disclosure generally related to determining the location of a disturbance event in power system.

In some embodiments, the present disclosure A system to determine the direction of a disturbance event in a power system. The system includes a power feed bus for supplying electrical signal and an Intelligent Electronic Device coupled to the power feed bus. The Intelligent Electronic Device determines the single-phase direction of the disturbance event according to the changes between the average pre-event power, average pre-event current and average pre-event voltage and the average post-event power, average post-event current and average post-event voltage.

In some other embodiments, the present disclosure provides a method for determining the direction of a disturbance event in a power system. The method includes capturing a first number cycles of pre-event signals for each phase and a second number cycles of post-event signals for each phase after detecting a disturbance event in a measuring point; measuring the power, current and voltage for each cycle of pre-event signals and post-event signals; computing the average power, current and voltage for pre-event signals and post-event signals; identifying the data trend of power, current and voltage of the post-event signals; determining the location of the single-phase disturbance relative to the metering point.

These and other features and aspects of the present disclosure will become fully apparent from the following detailed description of exemplary embodiments, the appended claims and the accompanying drawings.

BRIEF DESCRIPTION OF THE DRAWINGS

FIG. 4 is a table showing the determination of single-phase disturbance direction according to observed power, current and voltage changes.

FIG. 5 is a table showing the determination of final disturbance direction according to each single-phase disturbance direction.

DETAILED DESCRIPTION

Embodiments of the present disclosure will be described herein with reference to the accompanying drawings. In the following descriptions, well-known functions or constructions are not described in detail to avoid obscuring the present disclosure. The word "exemplary" is used herein to mean "serving as an example." Any configuration or design described herein as "exemplary" is not to be construed as preferred, or advantageous, over other configurations or designs. Herein the phrase "coupled" is defined as "directly connected to or indirectly connected with" one or more intermediate components. Such intermediate components may include both hardware and software-based components.

It is further noted that, unless otherwise indicated, all functions described herein may be implemented in either software, hardware, or some combination thereof.

It should be recognized that the present disclosure can be performed in numerous ways, including as a process, an apparatus, a system, a method, or a computer-readable medium such as a computer storage medium.

As used herein. Intelligent Electronic Devices ("IEDs") can be any device that senses electrical parameters and computes data including, but not limited to, Programmable Logic Controllers ("PLCs"), Remote Terminal Units ("RTUs"), electrical power meters, protective relays, fault recorders, phase measurement units, and other devices which are coupled with power distribution networks to control and manage the distribution or consumption of electrical power.

Figure 1:
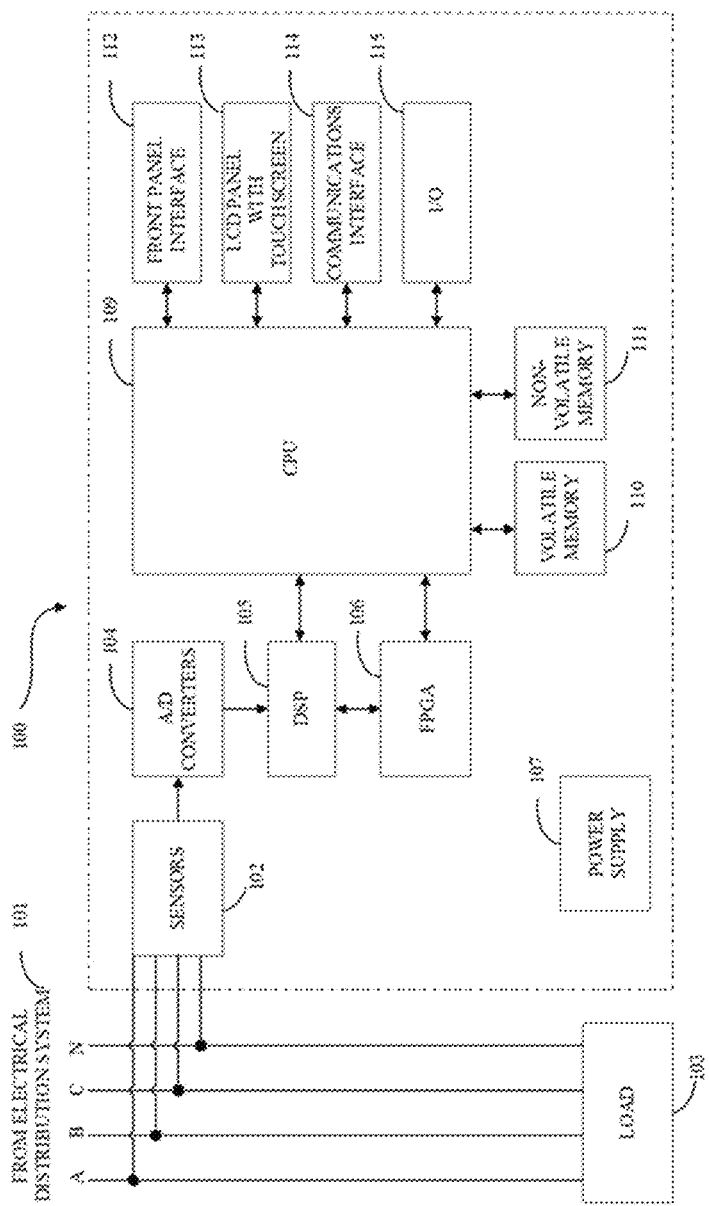
FIG. 1 is a block diagram of an exemplary Intelligent Electronic Device.

FIG. 1 is a block diagram of an Intelligent Electronic Device (IED) 100 for monitoring power usage and power quality for any metered point within a power distribution system 101.

The IED 100 illustrated in FIG. 1 includes multiple sensors 102 coupled with various phases A, B, C, and N (neutral) of an electrical distribution system 101, multiple analog-to-digital (A/D) converters 104, a power supply 107, volatile memory 110, non-volatile memory 111, a front panel interface 112, and a processing module that includes at least one Central Processing Unit (CPU) and/or one or more Digital Signal Processors (DSP), two of which are shown DSP 105 and CPU 109. The IED 100 also includes a Field Programmable Gate Array (FPGA) 106 which performs several functions including acting as a communications bridge for transferring data between the various processors (105 and 109).

The sensors 102 sense electrical parameters, such as voltage and current, on incoming lines (phase A, phase B, phase C. and neutral N) of an electrical power distribution system 101 coupled to at least one load 103 that consumes the provided power. In one embodiment, the sensors 102 include current transformers and potential transformers, where one current transformer and one voltage transformer will be coupled to each phase of the incoming power lines. The primary winding of each transformer will be coupled to the incoming power lines, and the secondary winding of each transformer will output a voltage representative of the sensed voltage and current. The output of each transformer will be coupled with the A/D converters 104, which are configured to convert the analog voltage output from the transformer to a digital signal that can be processed by the DSP 105.

A/D converters 104 are configured to convert an analog voltage output to a digital signal that is transmitted to a gate array, such as Field Programmable Gate Array (FPGA) 106. The digital signal is then transmitted from the FPGA 106 to the CPU 109.

The CPU 109 or DSP Processors 105 are configured to receive digital signals from the A/D converters 104 and perform the necessary calculations to determine power usage and control the overall operations of the IED 100. In some embodiments, the CPU 109 and DSP 105 may be combined into a single processor to serve the functions of each component. In some embodiments, it is contemplated to use an Erasable Programmable Logic Device (EPLD), a Complex Programmable Logic Device (CPLD), or any other programmable logic device in place of the FPGA 106. In some embodiments, the digital samples, which are output from the A/D converters 104, are sent directly to the CPU 109, effectively bypassing the DSP 105 and the FPGA 106 as a communications gateway.

The power supply 107 provides power to each component of the IED 100. In one embodiment, the power supply 107 is a transformer with its primary windings coupled to the incoming power distribution lines to provide a nominal voltage at its secondary windings. In other embodiments, power may be supplied from an independent power source to the power supply 107.

In FIG. 1, the front panel interface 112 is shown coupled to the CPU 109, which includes indicators, switches, and various inputs.

In FIG. 1, the LCD panel with touchscreen 113 is shown coupled to the CPU 150 for interacting with a user and for communicating events, such as alarms and instructions. The LCD panel with touchscreen 113 may provide information to the user in the form of alpha-numeric lines, computer-generated graphics, videos, animations, etc.

An Input/Output (I/O) interface 115 may be provided for receiving externally generated inputs from the IED 100 and for outputting data, such as serial data, to other devices. In one embodiment, the I/O interface 115 may include a connector for receiving various cards and/or modules that increase and/or change the functionality of the IED 100. In a further embodiment, the I/O interface 115 may include digital output for energy pulse.

The IED 100 also includes volatile memory 110 and non-volatile memory 111. The volatile memory 110 will store the sensed and generated data for further processing and for retrieval when requested to be displayed at the IED 100 or from a remote location. The volatile memory 110 includes internal storage memory, such as Random-Access Memory (RAM). The non-volatile memory 111 includes removable memory, such as magnetic storage memory, optical storage memory (such as various types of CD or DVD media), solid-state storage memory, (such as a CompactFlash card, a Memory Stick, SmartMedia card, MultiMediaCard [MMC], SD [Secure Digital] memory), or any other memory storage that exists currently or will exist in the future. Such memory will be used for storing historical trends, waveform captures, event logs (including timestamps), and stored digital samples for later download to a client application, webserver, or PC application.

In a further embodiment, the IED 100 will include a communication interface 114, also known as a network interface, for enabling communications between the IED, or meter, and a remote terminal unit or programmable logic controller and other computing devices, microprocessors, desktop computers, laptop computers, other meter modules, etc. The communication interface 114 may be a modem, Network Interface Card (NIC), wireless transceiver, or other interface. The communication interface 114 will operate with hardwired and/or wireless connectivity. A hardwired connection may include, but is not limited to, physical cabling (such as parallel cables serial cables, RS232. RS485. USB cables, or Ethernet) and an appropriately configured communication port. The wireless connection may operate under any of the various wireless protocols including, but not limited to, Bluetooth™ interconnectivity, infrared connectivity, radio transmission connectivity (including computer digital signal broadcasting and reception commonly referred to as Wi-Fi or 802.11.X [where x denotes the type of transmission]), satellite transmission, or any other type of communication protocol, communication architecture, or systems currently existing or to be developed for wirelessly transmitting data.

The IED 100 may communicate to a server or other computing device via the communication interface 114. The IED 100 may be connected to a communications network (such as the Internet) by any means. For example, a hardwired or wireless connection, such as dial-up, hardwired, cable, DSL, satellite, cellular, PCS, or wireless transmission (e.g., 802.11a/b/g) may be used. It is noted that the network may be a Local Area Network (LAN), Wide Area Network (WAN), the Internet, or any network that couples multiple computers to enable various modes of communication via network messages. Furthermore, the server will communicate using various protocols, such as Transmission Control Protocol/Internet Protocol (TCP/IP), File Transfer Protocol (FTP), or Hypertext Transfer Protocol (HTTP) or via secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, or via other secure protocol. The server may further include a storage medium for storing the data received from at least one IED or meter and/or storing data to be retrieved by the IED or meter.

In an additional embodiment, when a power event occurs, such as a voltage surge, voltage sag, or current short circuit, the IED 100 may also have the capability of not only digitizing waveforms but storing the waveform and transferring that data upstream to a central computer, such as a remote server. The power event may be captured, stored to memory (e.g., non-volatile RAM), and additionally transferred to a host computer within the existing communication infrastructure either immediately, in response to a request from a remote device or computer, or later in response to a polled request. The digitized waveform will also allow the CPU 109 to compute other electrical parameters such as harmonics, magnitudes, symmetrical components, and phasor analysis.

In a further embodiment, the IED 100 will execute an e-mail client and will send notification e-mails to the utility or directly to the customer when a power quality event occurs. This allows utility companies to dispatch crews to repair the condition. The data generated by the meters is used to diagnose the cause of the condition. The data is transferred through the infrastructure created by the electrical power distribution system. The e-mail client will utilize POP3 or another standard e-mail protocol.

The techniques of the present disclosure can be used to automatically maintain program data and provide field-wide updates upon which IED firmware and/or software can be upgraded. An event command can be issued by a user, on a schedule, or through a digital communication that will trigger the IED 100 to access a remote server and obtain the new program code. This will ensure that program data will be maintained, assuring the user that all information is displayed identically on all units.

It is to be understood that the present disclosure may be implemented in various forms of hardware, software, firmware, special purpose processors, or a combination thereof. The IED 100 also includes an operating system and application programs. The various processes and functions described herein may either be part of an application program (or a combination thereof) which is executed via the operating system.

Because some of the system components and methods depicted in the accompanying figures may be implemented using either software or firmware, it is to be further understood that the actual connections between the system components (or the process steps) may differ depending on the specific way the present disclosure is programmed. Given the teachings of the present disclosure provided herein, one of ordinary skill in the related art will be able to contemplate these and similar implementations or configurations of the present disclosure.

Figure 2:
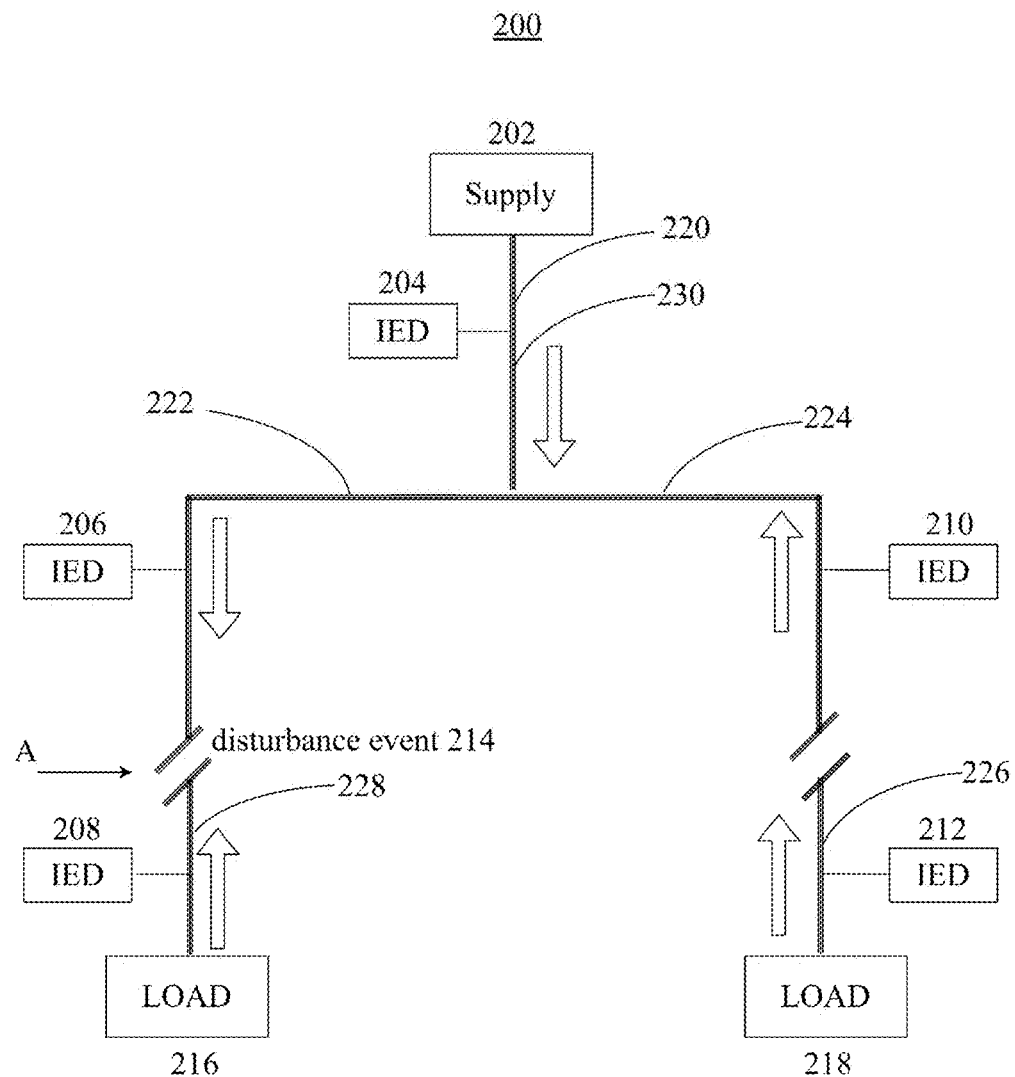
FIG. 2 is a schematic diagram which illustrates an example of identifying a disturbance location in a power system.

FIG. 2 will now be discussed, which illustrates an example of identifying a disturbance location A in a power system 200. IED 204 is located on a power feed bus 220 of power system 200. The feed bus 220, which is monitored by the IED 204, supplies electrical power to a first circuit branch 230. Similarly, the first branch circuit 230 supplies electrical power to a second circuit 222, which is monitored by IED 206, and to a third branch circuit 224, which is monitored by IED 210.

Disturbance direction detection can help locate the source of a disturbance when used in a system of disturbance direction devices. In FIG. 2, IED 206, IED 208, IED 210 and IED 212 as power monitoring equipment are deployed on the power consumer side, while IED 204 is deployed on the utility side. The arrows show the direction the IEDs have determined for the disturbance, where the upward arrow represents upstream, and the downward arrow represents downstream. Upstream indicates disturbance occurring on the generation/provider side of the IED. Downstream indicates disturbance occurring on the consumer/load side of the IED. IED 212 reports an upstream disturbance. IED 210 reports an upstream disturbance. IED 206 reports a downstream disturbance. IED 208 reports an upstream disturbance. IED 204 reports a downstream disturbance. With the information, the engineer can determine that the disturbance occurred between IED 206 and IED 208. Then the engineer can focus on that section to find the root cause of the disturbance.

Each IED in FIG. 2 can capture electrical data when some set of preset electrical condition is met. The preset electrical condition in power system 200 may include over or under conditions of monitored voltage. When a preset condition is observed by the IED, an alarm or trigger happens resulting message notification, event logging or event triggers.

When an alarm occurs in an IED, a waveform capture of configurable resolution and duration can be triggered as well as other logging or notification events. Installations with multiple power monitoring equipment, may network such equipment together so that any IED may collect data capture events from the other interconnected IED. Thus, one IED can provide a system-wide analysis of the disturbing event.

The IED. e.g., the IED 204, 206, 208 of FIG. 2, is set up to trigger on the voltage changes for a measuring point. When a disturbance event occurs, a waveshape alarm or a sag/swell alarm is activated, which triggers a waveform capture on the measuring point. Since the evaluation is based on changes that occur when the event occurs, the waveform capture must contain at least 3 pre-event cycles. When the waveform capture is triggered, the raw data for the entire capture may be collected in volatile memory 110. The captured data contains a variable number of cycles depending on the resolution of the waveform capture. In a multi-phase circuit, each of the power phases may be independently monitored and analyzed.

Figure 3:
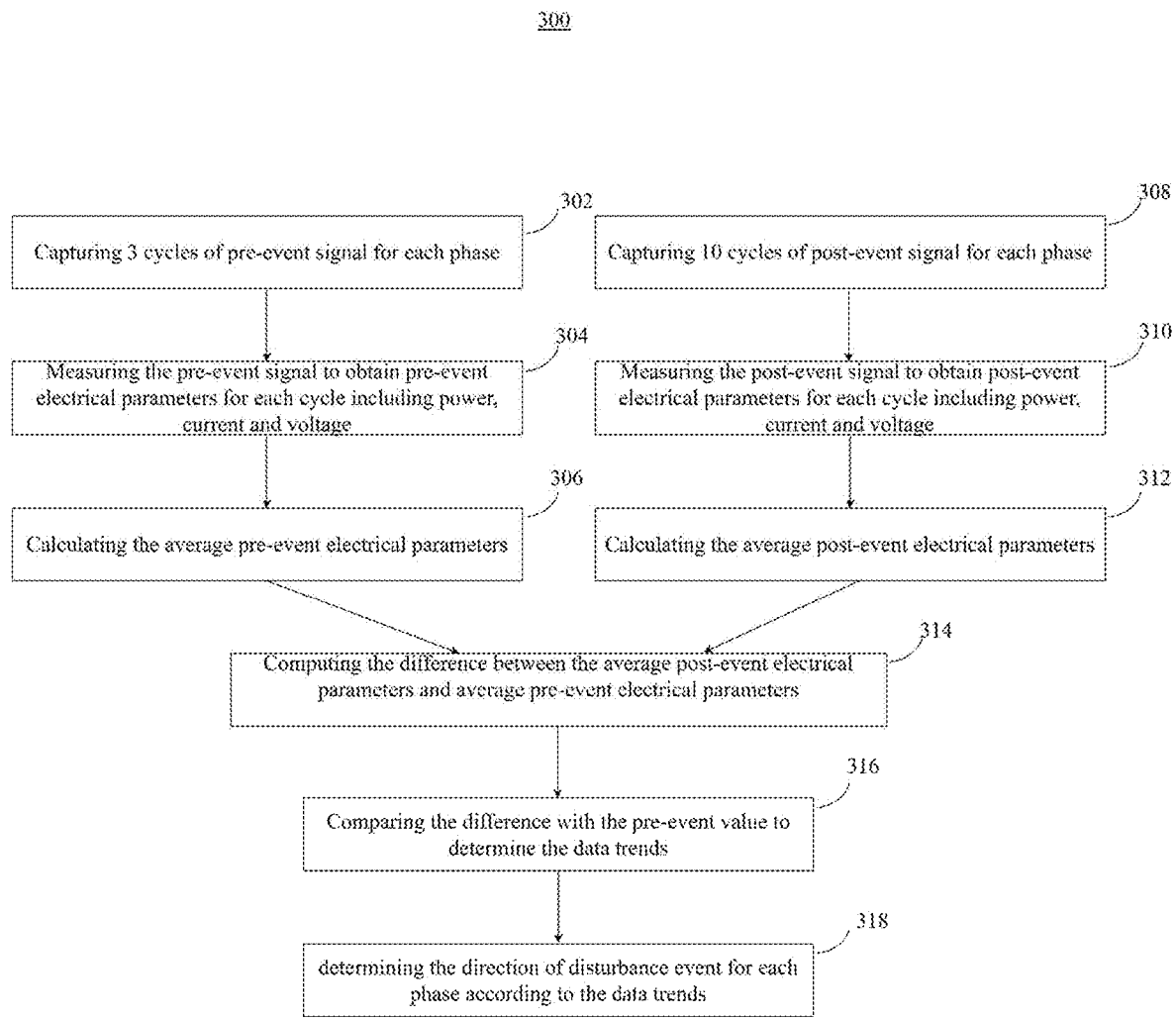
FIG. 3 is a flow chart illustrating a method of how a single-phase disturbance direction is detected based on the observed changes in voltage, current and power for a single phase.

Turning now to FIG. 3, which illustrates how a single-phase disturbance direction is detected based on the observed changes in voltage, current and power for a single phase. When a disturbance event 214 occurs, the IED. e.g., IED 208 activates waveshape alarm, which triggers a waveform capture on the measuring point.

In step 302, IED 208 captures 3 cycles of pre-event signal for phase A (or one of phase B and phase C) after waveshape alarm is activated. In some embodiments, IED 208 captures more than 3 cycles of pre-event signal for phase A (or one of phase B and phase C) after waveshape alarm is activated. In other embodiments, IED 208 captures more than 3 cycles of pre-event signal for phase A (or one of phase B and phase C) after waveshape alarm is activated, then IED 208 removes some unstable cycles of pre-event signals from the collected pre-event cycles. Then the remaining cycles of pre-event signal for phase A will be further processed in step 304. The unstable cycles of pre-event signals are cycles of pre-event signal where the pre-event waveform is smaller than the specified threshold (e.g., below 10% of normal magnitude).

In step 304. IED 208 measures pre-event RMS (Root Mean Square) voltage $V_{RMS1\_phaseA\_pre\_event}$ for the first cycle, $V_{RMS2\_phaseA\_pre\_event}$ for the second cycle, and $V_{RMS3\_phaseA\_pre\_event}$ for the third cycle. Then IED 208 measures pre-event RMS current $I_{RMS1\_phaseA\_pre\_event}$ for the first cycle, $I_{RMS2\_phaseA\_pre\_event}$ for the second cycle, and $I_{RMS3\_phaseA\_pre\_event}$ for the third cycle. Finally, IED 208 measures pre-event RMS power $P_{RMS1\_phaseA\_pre\_event}$ for the first cycle. $P_{RMS2\_phaseA\_pre\_event}$ for the second cycle, and $P_{RMS3\_phaseA\_pre\_event}$ for the third cycle.

In step 306, IED 208 calculates the average pre-event RMS voltage $V_{avg\_pre\_event}$, average pre-event RMS current $I_{avg\_pre\_event}$ and average pre-event RMS power $P_{avg\_pre\_event}$ for the 3 cycles of pre-event signal as below.

$$V_{avg\_pre\_event} = \frac{V_{RMS1\_phaseA\_pre\_event} + V_{RMS2\_phaseA\_pre\_event} + V_{RMS3\_phaseA\_pre\_event}}{3}$$

$$I_{avg\_pre\_event} = \frac{I_{RMS1\_phaseA\_pre\_event} + I_{RMS2\_phaseA\_pre\_event} + I_{RMS3\_phaseA\_pre\_event}}{3}$$

$$P_{avg\_pre\_event} = \frac{P_{RMS1\_phaseA\_pre\_event} + P_{RMS2\_phaseA\_pre\_event} + P_{RMS3\_phaseA\_pre\_event}}{3}$$

In step 308, IED 208 captures 10 cycles of post-event signal for phase A (or one of phase B and phase C) after waveshape alarm is activated. In some embodiments. IED 208 captures specified number of cycles of post-event signal for phase A. In other embodiments, after waveshape alarm is activated, IED 208 captures the post-event signal until the earlier of two conditions: either specified cycles (e.g., 10 cycles) of post-event signal are captured or disturbance event ends.

In step 310, IED 208 measures RMS voltage, RMS current and RMS power for each cycle of cycles of post-event captured signal. For example, when IED 208 captures the 3 cycles of post-event signal, disturbance event ends. In this case, IED 208 measures post-event RMS voltage $V_{RMS1\_phaseA\_post\_event}$ for the first cycle, $V_{RMS2\_phaseA\_post\_event}$ for the second cycle, and $V_{RMS3\_phaseA\_post\_event}$ for the third cycle. Then IED 208 measures post-event RMS current $I_{RMS1\_phaseA\_post\_event}$ for the first cycle, $I_{RMS2\_phaseA\_post\_event}$ for the second cycle, and $I_{RMS3\_phaseA\_post\_event}$ for the third cycle. Finally, IED 208 measures post-event RMS power $P_{RMS1\_phaseA\_post\_event}$ for the first cycle, $P_{RMS2\_phaseA\_post\_event}$ for the second cycle, and $P_{RMS3\_phaseA\_post\_event}$ for the third cycle.

In step 312, IED 208 calculates the average post-event RMS voltage $V_{avg\_post\_event}$, average post-event RMS current $I_{avg\_post\_event}$ and average post-event RMS power $P_{avg\_post\_event}$ for 3 cycles of post-event signal as below.

$$V_{avg\_post\_event} = \frac{V_{RMS1\_post\_event} + V_{RMS2\_post\_event} + V_{RMS3\_post\_event}}{3}$$

$$I_{avg\_post\_event} = \frac{I_{RMS1\_post\_event} + I_{RMS2\_post\_event} + I_{RMS3\_post\_event}}{3}$$

$$P_{avg\_post\_event} = \frac{P_{RMS1\_post\_event} + P_{RMS2\_post\_event} + P_{RMS3\_post\_event}}{3}$$

In step 314, IED 208 computes the difference between the post-event average electrical parameters and pre-event average electrical parameters as below.

$$V_{diff} = V_{avg\_post\_event} - V_{avg\_pre\_event}$$

$$I_{diff} = I_{avg\_post\_event} - I_{avg\_pre\_event}$$

$$P_{diff} = P_{avg\_post\_event} - P_{avg\_pre\_event}$$

Where $V_{diff}$ is the difference between the post-event average voltage $V_{avg\_post\_event}$ and the pre-event average voltage $V_{avg\_pre\_event}$, $I_{diff}$ is the difference between the post-event average current $I_{avg\_post\_event}$ and the pre-event average current $I_{avg\_pre\_event}$, $P_{diff}$ is the difference between the post-event average power $P_{avg\_post\_event}$ and the pre-event average power $P_{avg\_pre\_event}$.

In step 316, IED 208 compares the difference with the average pre-event value to determine the data trends.

First IED 208 compares the $V_{diff}$ with $V_{avg\_pre\_event}$ to determine whether the voltage increases, decreases or keeps no change according to table 1. It should be noted that Table 1 only provides an exemplary condition for voltage change.

TABLE 1 voltage trends determination table

| Condition | Voltage trends |
|---|---|
| $V_{diff} < -(3\% \ V_{avg\_pre\_event})$ | Voltage decrease |
| $V_{diff} > 3\% \ V_{avg\_pre\_event}$ | Voltage increase |
| Other conditions | Voltage no change |

Secondly IED 208 compares the $I_{diff}$ with $I_{avg\_pre\_event}$ to determine whether the current increases, decreases or keeps no change according to table 2. It should be noted that Table 2 only provides an exemplary condition for current change.

TABLE 2 current trends determination table

| Condition | current trends |
|---|---|
| $I_{diff} < -(3\% \ I_{avg\_pre\_event})$ | current decrease |
| $I_{diff} > 3\% \ I_{avg\_pre\_event}$ | current increase |
| Other conditions | current no change |

Finally. IED 208 compares the $P_{diff}$ with $P_{avg\_pre\_event}$ to determine whether the power increases, decreases or keeps no change according to table 3. It should be noted that Table 3 only provides an exemplary condition for power change.

TABLE 3 power trends determination table

| Condition | Data trends |
|---|---|
| $P_{diff} < -(3\% \ P_{avg\_pre\_event})$ | power decrease |
| $P_{diff} > 3\% \ P_{avg\_pre\_event}$ | power increase |
| Other conditions | power no change |

In step 318. IED 208 determines the direction of disturbance event for each phase according to the data trends. After IED 208 obtains the data trends of voltage, current and power. IED 208 can determine the direction of disturbance event by looking up the table in FIG. 4.

Referring to FIG. 4, a direction determination table is illustrated, which provides disturbance direction based on the observed changes in voltage, current and power for a single phase. The central columns of FIG. 4 represent all possible combinations of "no change", "increase", or "decrease" for voltage, current and power of each phase.

An example is provided, using the illustrative power system reference of FIG. 2, where a disturbance event 214 happens in location A. IED 208 is activated by the disturbance event 214 and captures waveforms before the event and after the event. IED 208 determines a combination of "increase", "no change" and "increase" for voltage, current and power of phase A (or any of phase B and phase C) using the method illustrated in FIG. 3. IED 208 can determine that the disturbance event 214 locates upstream of IED 208 for phase A according to the 11th column in FIG. 4.

Referring to FIG. 5, a final direction determination table is illustrated, which provides a final disturbance direction based on the direction detected by an IED for each phase (phase A, phase B or phase C). Each IED in FIG. 2 can determine the disturbance direction for each phase as described in FIG. 4. After an IED determines the disturbance direction for each phase, a final disturbance direction will be determined by looking up the final direction determination table. The central columns of FIG. 5 represent all possible combinations of "indeterminate", "downstream", or "upstream" for phase A direction, phase B direction and phase C direction.

An example is provided, using the illustrative power system reference of FIG. 2, where a disturbance event 214 happens in location A. IED 208 determines a combination of "indeterminate", "indeterminate" and "upstream" for phase A direction, phase B direction and phase C direction. IED 208 can finally determine that the disturbance event 214 locates upstream of IED 208 according to the 3rd column in FIG. 5.

Figure 6:
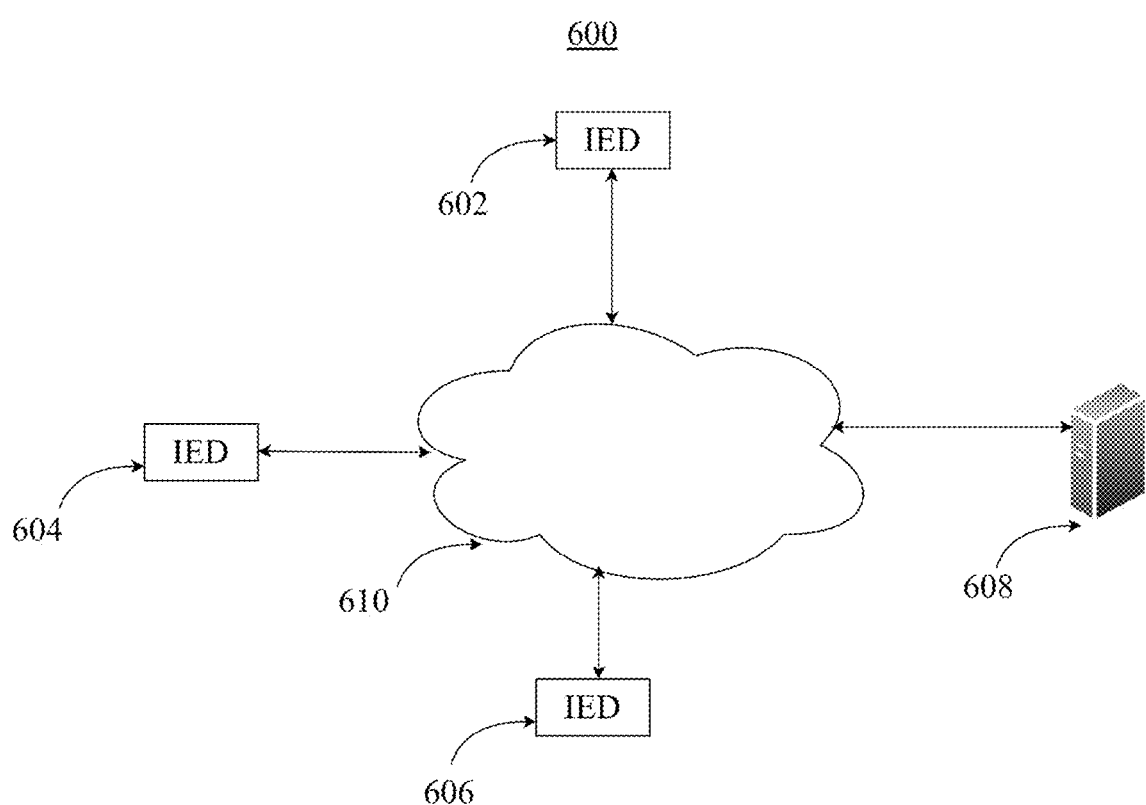
FIG. 6 is a schematic diagram illustrating a disturbance monitoring system.

FIG. 6 will now be discussed, which illustrates a disturbance monitoring system 600. The disturbance monitoring system 600 includes IEDs (e.g., IED 602. IED 604 and IED 606), a server 608 and a transmission network 610. The transmission network 610 may be based on coaxial, fiber, or radio wave. IEDs in FIG. 6 measure the disturbance direction data and transmit the disturbance direction data to server 608 through network 610. In some embodiments, server 608 may be a cloud-based server. Server 608 may display the disturbance location on a webpage visually according to the received disturbance direction data from IEDs.

Figure 7:
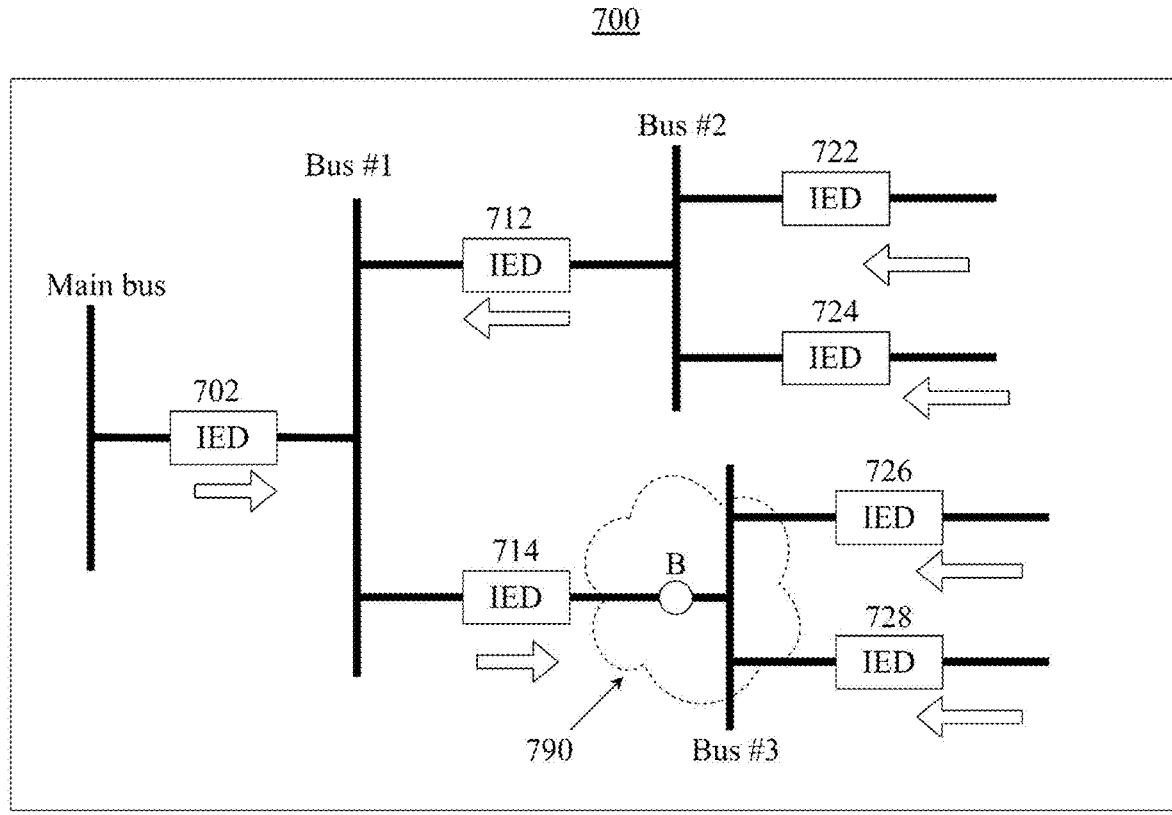
FIG. 7 is a schematic diagram illustrating a disturbance location in a power system.

Turning now to FIG. 7, which is schematic diagram displaying a disturbance location B in a power system 700. The power system 700 may be displayed as part of a webpage in a cloud-based server. Customers may visit the webpage through network 610 to monitor the power system's operating status. The power system 700 includes some power feed buses (e.g., Main bus, Bus #1, Bus #2, Bus #3), IEDs (e.g., IED 702. IED 712, IED 714), and some arrows. The arrows show the direction the IEDs have determined for the disturbance, where the left arrow represents upstream, and the right arrow represents downstream. In FIG. 7, cloud-based server can determine that the disturbance location B is in an area 790 according to the directions IEDs have determined for the disturbance. In some embodiments, cloud-based server may transmit a message though an email or SMS to a customer when a disturbance occurs. The message includes the geographic location information regarding area 790. The customer may send field crews to fix the disturbance issue.

Embodiments of the teachings of the present disclosure have been described in an illustrative manner. It is to be understood that the terminology that has been used, is intended to be in the nature of words of description rather than of limitation. Many modifications and variations of the embodiments are possible in light of the above teachings. Therefore, within the scope of the appended claims, the embodiments can be practiced other than specifically described.

What is claimed is:

1. A system to determine the direction of a disturbance event in a power system comprising:
    a power feed bus for supplying electrical signal; and
    an Intelligent Electronic Device coupled to the power feed bus;
    wherein the Intelligent Electronic Device is configured to:
        capture a first number of cycles of pre-event signals and a second number of cycles of post-event signals for each phase of the power system after detecting the disturbance event;
        compute average pre-event power, average pre-event current, and average pre-event voltage from the pre-event signals, and average post-event power, average post-event current, and average post-event voltage from the post-event signals;
        determine a single-phase direction of the disturbance event for each phase by comparing changes between the average pre-event power, average pre-event current, and average pre-event voltage and the average post-event power, average post-event current, and average post-event voltage against a predefined threshold to identify data trends, and mapping the data trends to a direction using a direction determination table; and
        determine a final direction of the disturbance event based on a combination of the single-phase directions for multiple phases using a final direction determination table.

2. The system of claim 1, wherein the final direction determination table defines combinations of single-phase directions for each phase as upstream, downstream, or indeterminate to determine the final direction of the disturbance event.

3. A method of determining the direction of a disturbance event in a power distribution system comprising:
    capturing a first number cycles of pre-event signals for each phase and a second number cycles of post-event signals for each phase after detecting a disturbance event in a measuring point;
    measuring the power, current and voltage for each cycle of pre-event signals and post-event signals;
    computing the average power, current and voltage for pre-event signals and post-event signals;
    identifying the data trend of power, current and voltage of the post-event signals by comparing differences between the average pre-event and post-event values against a predefined threshold;
    determining the location of the single-phase disturbance relative to the metering point by mapping the data trends to a direction using a direction determination table; and
    determining the final location of the disturbance event based on a combination of the single-phase directions for multiple phases using a final direction determination table.

4. The method of claim 3, wherein the second number cycles of post-event signals include 10 cycles of post-event signals captured until the earlier of a specified number of cycles or the end of the disturbance event.

5. The method of claim 3, wherein the final direction determination table defines combinations of single-phase directions for each phase as upstream, downstream, or indeterminate to determine the final location of the disturbance.

6. The method of claim 3, wherein the measuring the power, current and voltage for each cycle of pre-event signals and post-event signals is performed by a single Intelligent Electronic Device.

7. The method of claim 3, wherein the measuring the power, current and voltage for each cycle of pre-event signals and post-event signals is performed by a plurality of Intelligent Electronic Devices.

8. The method of claim 3, wherein each of the plurality of Intelligent Electronic Devices network with other Intelligent Electronic Devices.

9. The method of claim 3, wherein each of the plurality of Intelligent Electronic Devices perform a system-wide location of the disturbance according to the location information from every Intelligent Electronic Device.

* * * * *